United States Patent [19]
Leong

[11] Patent Number: 6,099,098
[45] Date of Patent: *Aug. 8, 2000

[54] SELF-LOCKING MOUNTING APPARATUS

[75] Inventor: Ming Huat Leong, Los Gatos, Calif.

[73] Assignee: Compaq Computer Corporation, Houston, Tex.

[*] Notice: This patent issued on a continued prosecution application filed under 37 CFR 1.53(d), and is subject to the twenty year patent term provisions of 35 U.S.C. 154(a)(2).

[21] Appl. No.: 09/134,080

[22] Filed: Aug. 14, 1998

[51] Int. Cl.[7] .................................................. A47B 88/00
[52] U.S. Cl. ......................... 312/333; 312/223.2; 292/19
[58] Field of Search .................................. 312/333, 223.2, 312/334.7, 334.44, 334.46; 292/19, 20, 80, 81, 87, 303, 341.17, DIG. 63

[56] References Cited

U.S. PATENT DOCUMENTS

| | | | |
|---|---|---|---|
| 1,473,325 | 11/1923 | Schwer | 292/19 |
| 2,195,223 | 3/1940 | O'Connor | 292/19 |
| 4,922,125 | 5/1990 | Casanova et al. | 361/683 X |
| 4,979,909 | 12/1990 | Andrews | 312/333 X |
| 5,123,721 | 6/1992 | Seo | 312/333 |
| 5,262,923 | 11/1993 | Batta et al. | 312/333 X |
| 5,379,184 | 1/1995 | Barraza et al. | 312/333 X |
| 5,683,159 | 11/1997 | Johnson | 312/223.2 X |
| 5,774,330 | 6/1998 | Melton et al. | 312/223.2 X |
| 5,795,044 | 8/1998 | Trewhella, Jr. et al. | 312/333 |

*Primary Examiner*—Peter M. Cuomo
*Assistant Examiner*—Hanh V. Tran
*Attorney, Agent, or Firm*—Fenwick & West LLP

[57] ABSTRACT

A self-locking mounting method and apparatus are disclosed. A self-locking mounting apparatus comprises a bracket for holding a storage device, a chassis having at least one flange for supporting the bracket, a retaining mechanism which engages the bracket upon insertion of the bracket into the chassis. The retaining mechanism may include a tab on the chassis and at least one latch on the bracket. The latch may be a spring latch. A plurality of flanges protruding from the chassis may be used to support the bracket. A method for mounting a self-locking apparatus includes the steps of attaching a storage device to a bracket, inserting the bracket into a chassis, the bracket being supported by at least one flange on the chassis, and engaging the bracket to the chassis with a retaining mechanism.

18 Claims, 6 Drawing Sheets

SELF-LOCKING MOUNTING APPARATUS

FIELD OF THE INVENTION

This application relates to a mounting apparatus, and more particularly, to a self-locking mounting apparatus for mounting storage devices in a computer cabinet.

BACKGROUND OF THE INVENTION

A computer cabinet is an enclosure which holds most of the parts of a computer system. These parts include central processing unit (CPU) boards, peripheral boards, disk drives, power supplies, fans, and cables. Typically, computer cabinets are tightly packed in order to keep the size of the system small enough to fit on or under a desk. The parts are attached to the computer cabinet with fastening hardware such as screws, which need to be small because of the tight fit inside the computer cabinet.

One problem with using screws to attach the computer system parts to the computer cabinet is that such screws may be difficult to access during the manufacturing and servicing of the computer system. When a field engineer or technician replaces a part which is fastened to a computer cabinet with screws, he typically reaches into the computer cabinet with a screwdriver in order to remove the screws which attach the part to the computer cabinet. Even if the technician can access the screws easily enough to unscrew them, he may drop the screws into the computer system. Then the technician must spend time retrieving the screw from inside the cabinet. If the screw is not retrieved, it may cause a short circuit on one of the boards depending on where the screw ends up. For at least these reasons, replacing parts in the computer system is a time-consuming and frustrating process.

The process may be particularly difficult and time-consuming if the number of fastening screws is high. Mounting a storage device such as a disk drive typically requires at least four screws. Two screws are positioned on each side of the disk drive, one toward the front and one toward the back, in order to mount the disk securely to the chassis. The screws are usually very small, therefore making it difficult for a technician to hold the screws in position while screwing them in with a screwdriver. The screws are inserted into holes which are on the disk drive assembly and on the chassis to which the disk drive assembly is being attached. The holes are difficult to align because they are also typically very small. Also, if the tolerances are incorrect, typically due to manufacturing defects, the holes may not line up exactly, making it difficult to insert the screw.

SUMMARY OF THE INVENTION

The present invention provides a self-locking mounting apparatus for mounting a storage device to the chassis of a computer cabinet without the use of additional fastening hardware such as screws. The storage device is attached to a bracket and then inserted into a chassis in the computer cabinet, where the storage device/bracket assembly rests on supports inside the chassis. The bracket includes at least one latch which may engage a tab on the front edge of the chassis when the storage device/bracket assembly is inserted far enough into the chassis. The latch may be disengaged from the tab so that the storage device/bracket assembly may be removed from the chassis.

In a preferred embodiment of the present invention, a self-locking mounting apparatus includes a bracket for holding a storage device, a chassis having flanges for receiving and supporting the bracket, a retaining mechanism which engages the bracket upon insertion of the bracket into the chassis and which securely engages or locks the bracket into place within the chassis. The retaining mechanism may include a tab on the chassis and at least one latch on the bracket. The latch may be a spring latch. The flanges protrude from the inside of the chassis. A method for mounting a self-locking apparatus includes the steps of attaching a storage device to a bracket, inserting the bracket and storage device into a chassis, the bracket being received and supported by flanges on the chassis, and engaging the bracket and storage device to the chassis with a retaining mechanism.

Advantages of the invention will be set forth, in part, in the description that follows and, in part, will be understood by those skilled in the art from the description or may be learned by practice of the invention. The advantages of the invention will be realized and attained by means of the methods, elements and combinations particularly pointed out in the appended claims and equivalents thereof.

BRIEF DESCRIPTION OF THE DRAWINGS

The accompanying drawings, which are incorporated in and constitute a part of this specification, illustrate several embodiments of the invention and, together with the description, serve to explain the principles of the invention.

DETAILED DESCRIPTION OF PREFERRED EMBODIMENTS

Reference will now be made in detail to preferred embodiments of the invention, examples of which are illustrated in the accompanying drawings. Wherever convenient, the same reference numbers will be used throughout the drawings to refer to the same or like parts.

Figure 1:
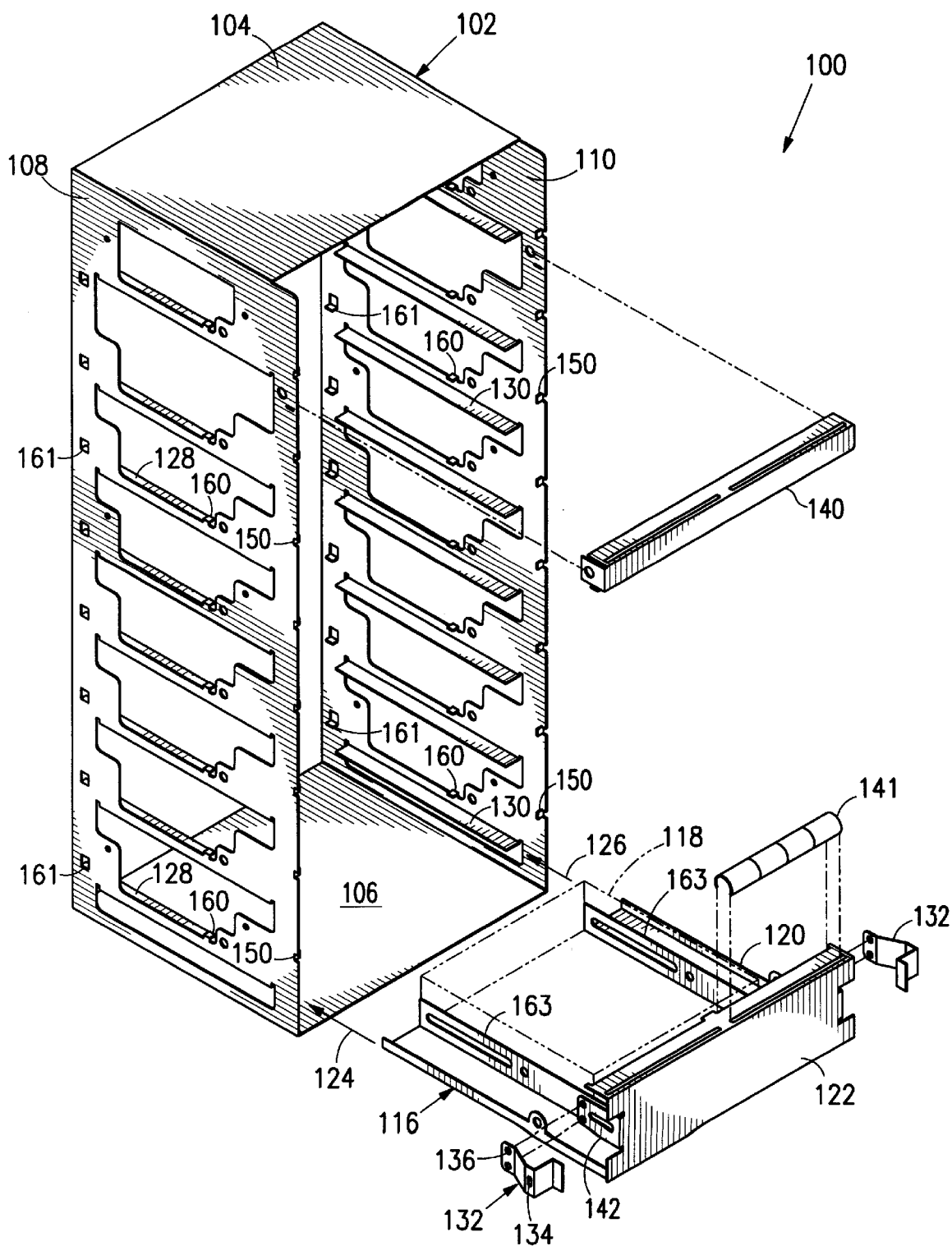
FIG. 1 is a perspective view of a self-locking mounting apparatus in accordance with a preferred embodiment of the present invention.

FIG. 1 shows a self-locking mounting apparatus 100 in accordance with a preferred embodiment of the present invention. Chassis 102 has a top 104, bottom 106, left side 108 and right side 110. The front and rear of chassis 102 are shown as being open but also could be enclosed provided that enough room is left to insert a storage device 118 and bracket 116 into chassis 102, and provided that any cables or connectors (not shown) connected to storage device 118 are accessible from chassis 102 to other parts of the computer system which may require them. Storage device 118 may be a disk drive, floppy drive, CD-ROM drive, tape drive, or any other device suitable for use in a computer cabinet or other cabinetry for containing electronic devices.

Bracket 116 attaches to storage device 118. In a preferred embodiment of the present invention, bracket 116 may be unitary (one-piece) or may be made from several pieces which are put together to form one bracket 116. Storage device 118 may have a bracket 116 built into it, thus removing the requirement of attaching bracket 116 to storage device 118 before inserting storage device 118 into chassis 102.

After bracket 116 is attached to storage device 118, a user slides the storage device/bracket assembly into chassis 102 in the direction of arrows 124 and 126. Bracket 116 rests on flanges 128 and 130 on the inside of chassis 102. In a preferred embodiment of the present invention, chassis 102 accommodates at least one storage device 118, and may accommodate multiple storage devices 118, as shown in FIG. 1. Additional storage devices 118 having brackets 116 may be mounted on flanges 128, 130. Tabs 160, 161 hold down surface 163 of bracket 116. Latch 132 includes a slot 134 for engaging with tab 150 on chassis 102. Latch 132 attaches to bracket 116 with any suitable fastener e.g., via holes 136, and engages with tab 150 of chassis 102 when bracket 116 and storage device 118 slide into place in chassis 102. In a preferred embodiment of the present invention, latch 132 is a spring latch but may be any hardware device capable of securely engaging tab 150. Disk drive chassis 102 may hold one disk drive or a plurality of disk drives as in, for example, a disk drive array. The sides 108 of chassis 102 may be open as shown, or may be closed. An optional EMI gap filler 140 may be included to provide additional protection from electromagnetic interference (EMI). The EMI gap filler 140 fits between the top of a disk drive and either the bottom of the disk drive above it or the top of the chassis. EMI gap filler 140 also fits between the bottom of a disk drive and either the top of the disk drive below it or the bottom of the chassis. It may be secured to the chassis by any suitable means. An EMI gasket 141 may be used to seal the space between the disk drive and EMI gap filler 140.

Figure 2:
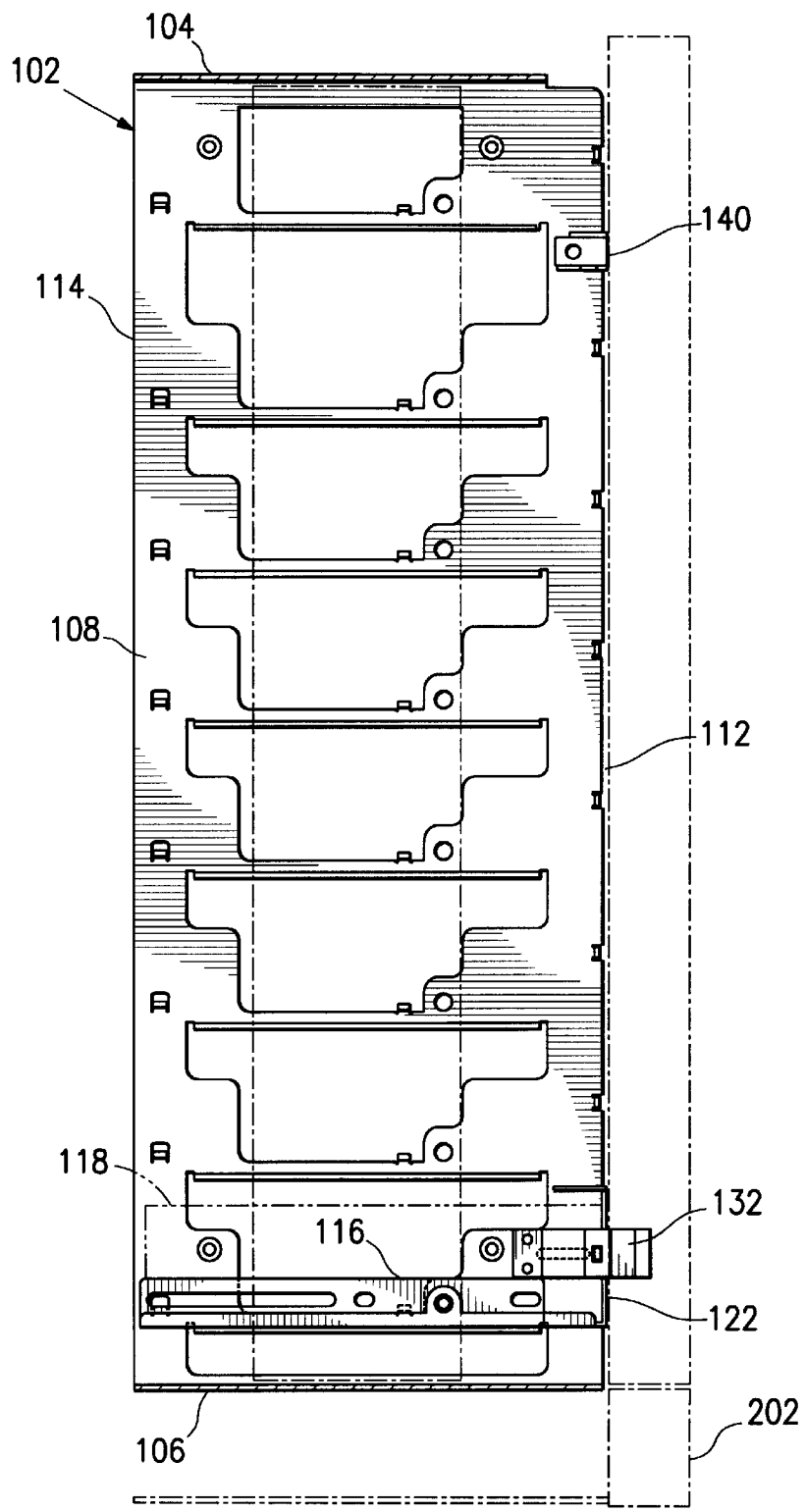
FIG. 2 is a side view of a self-locking mounting apparatus in accordance with a preferred embodiment of the present invention.

FIG. 2 is a side view of a self-locking mounting apparatus 100 in accordance with a preferred embodiment of the present invention. As previously noted, chassis 102 has a top 104, bottom 106, and sides 108,110. Only side 108 is shown in FIG. 2. Chassis 102 also has rear 114 and front 112. A storage device 118 is attached to bracket 116, inserted into chassis 102 and held in place by latch 132. Front panel 202 may be added after storage device 118 is inserted into chassis 102 in order to cover the front 112 of chassis 102. Although only one storage device 118 and bracket 116 assembly is shown, multiple assemblies of storage devices 118 and brackets 116 may be inserted into chassis 102. Front 122 of bracket 116 and EMI gap filler 140 are also shown.

Figure 3A:
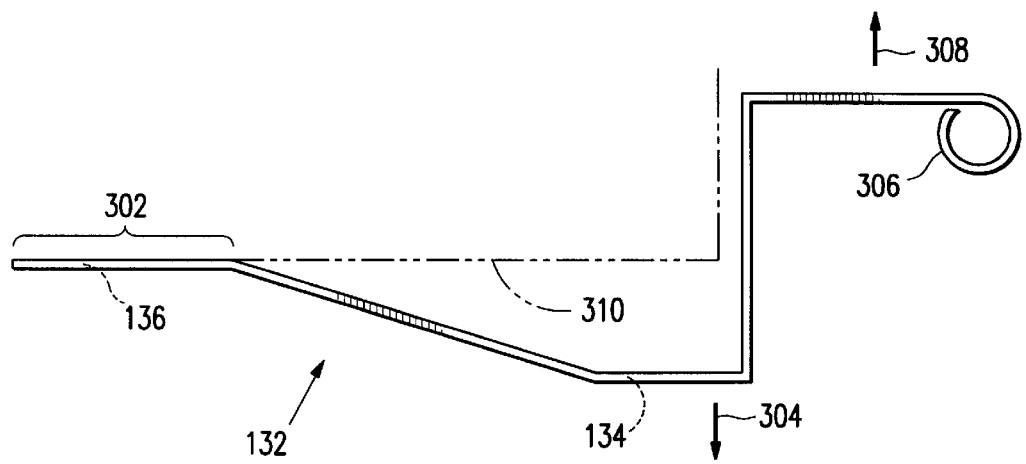
FIG. 3a is a top view of a latch used in a self-locking mounting apparatus in accordance with a preferred embodiment of the present invention.

FIG. 3a shows a top view of latch 132 in accordance with a preferred embodiment of the present invention. Attachment end 302 of latch 132 attaches to a stiffening rib 142 (FIG. 1). When self-locking apparatus 100 is in a locked position, latch 132 exerts an outward pressure as shown by arrow 304 on side 108 of chassis 102 so that slot 134 engages tab 150 located on the chassis 102. In order to remove disk drive 118, removal end 306 of latch 132 is pushed inward as shown by arrow 308, causing slot 134 on latch 132 to disengage from tab 150, thus allowing a user to remove disk drive 118 from the chassis 102. In a preferred embodiment of the present invention, latch 132 is a spring latch, but, alternately, may be any appropriately designed latch useful for holding a disk, for example, in place in a locked position.

Figure 3B:
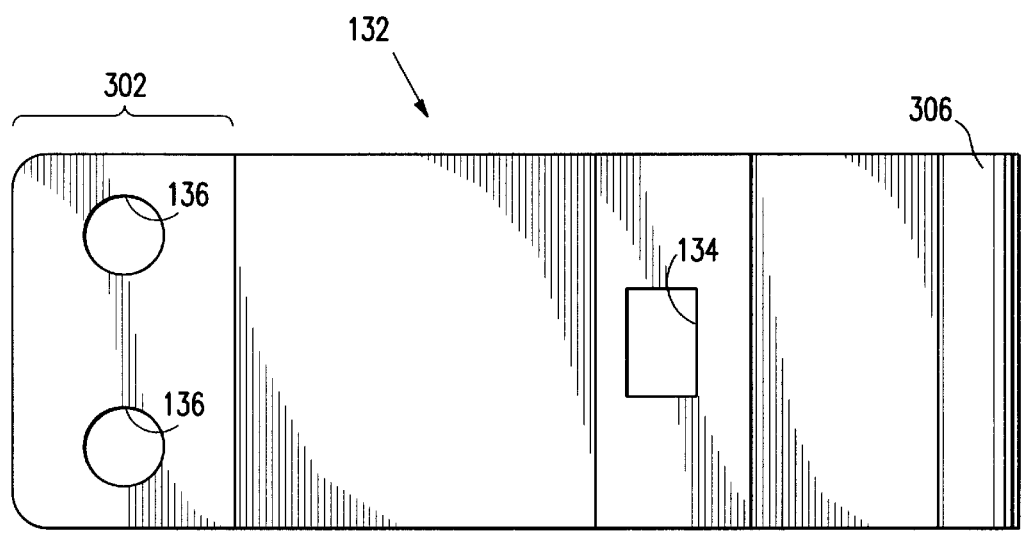
FIG. 3b is a side view of a latch used in a self-locking mounting apparatus in accordance with a preferred embodiment of the present invention.

FIG. 3b shows a side view of a latch 132. Attachment end 302 attaches to stiffening rib 142 (FIG. 1) via holes 136. Slot 134 engages with tab 150 of chassis 102. Slot 134 may be disengaged from tab 150 by moving removal end 306 in a direction away from tab 150, thus releasing the assembly of storage device 118 and bracket 116.

Figure 4A:
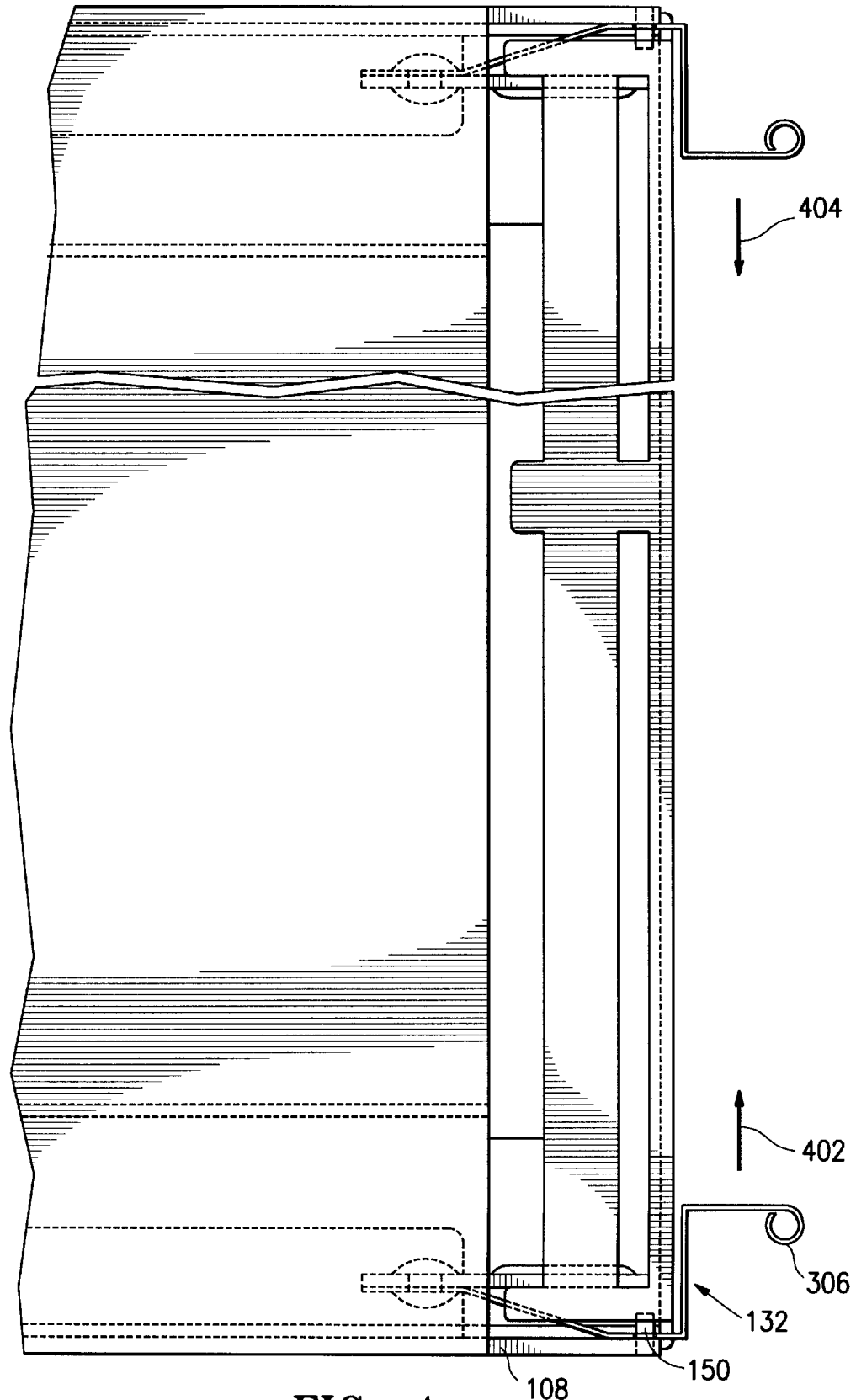
FIG. 4a is a top view of a self-locking mounting apparatus in accordance with a preferred embodiment of the present invention.
Figure 4B:
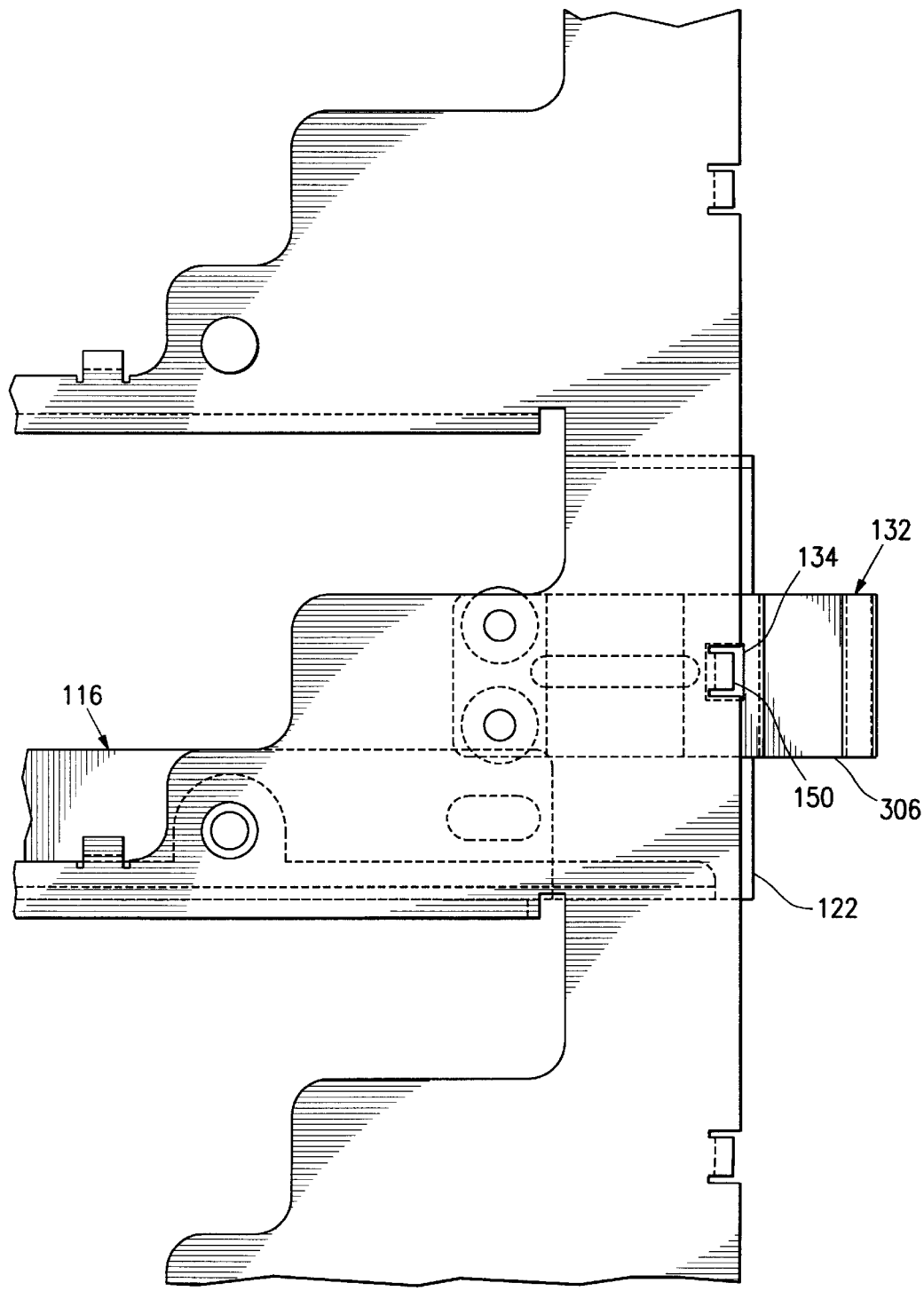
FIG. 4b is a side view of a self-locking mounting apparatus in accordance with a preferred embodiment of the present invention.
Figure 5:
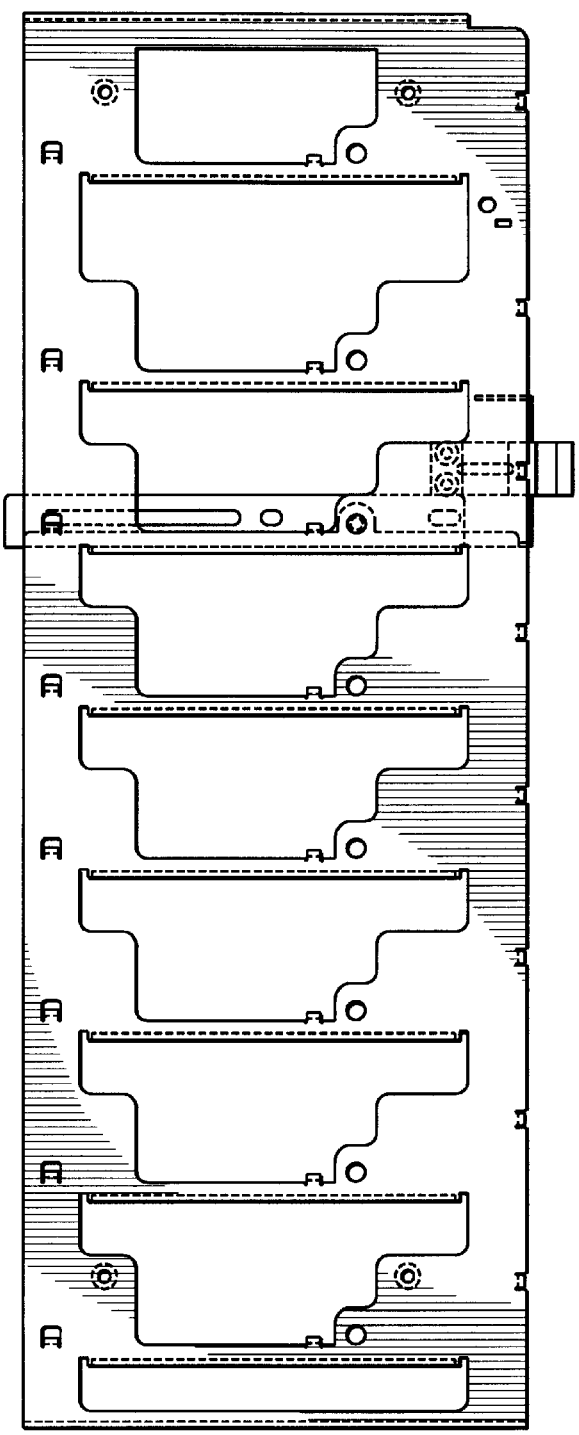
FIG. 5 is a side view showing an alternative embodiment of a self-locking mounting apparatus similar to that shown in FIG. 2.

FIG. 4a shows a top view of a preferred embodiment of self-locking mounting apparatus 100 of the present invention, shown in a locked position. FIG. 4b shows a side view of the same. Storage device 118 is mounted on bracket 116 having a front 122 (FIG. 1). Bracket 116 also has stiffening ribs 142 to which latch 132 is attached. Latch 132 is shown pressing against side 108 and engaging tab 150 of chassis 102, thus providing a retaining mechanism which prevents storage device 118 and bracket 116 from moving with respect to chassis 102. In order to unlock the mounting apparatus 100 and to remove storage device 118, the removal end 306 of latch 132 is pressed in the direction of arrows 402 and 404. This action releases the slot 134 from tab 150 side 108 of chassis 102 allowing storage device 118 and bracket 116 to be removed from chassis 102.

Other embodiments consistent with the present invention will be apparent to those skilled in the art from consideration of the specification and practice of the invention disclosed herein. For example, although the invention has been discussed specifically with reference to a disk drive computer storage device, the invention is also applicable to other electronic components, assemblies and devices designed for installation in an enclosure, such as computer power supplies, circuit boards, etc. It is intended that the specification and examples be considered as exemplary only, with a true scope of the invention being indicated by the following claims and equivalents.

What is claimed is:

1. A self-locking mounting apparatus for holding a storage device in a chassis, comprising:
    a bracket having a first side, a second side and a front, the front coupled to and between the first side and the second side, the bracket being insertable into the chassis; and
    a latch with a movable extension which protrudes beyond the front of the bracket, the latch mounted to one of the first side and second side of the bracket and adapted to secure the bracket in the chassis upon insertion of the bracket into the chassis.

2. The self-locking mounting apparatus of claim 1, wherein the latch is a spring latch.

3. The self-locking mounting apparatus of claim 1, wherein the bracket is a single piece.

4. A self-locking mounting apparatus for a storage device in a chassis, comprising:
    a bracket having a first side, a second side and a front, the front coupled to and between the first side and the second side and having an inner surface adapted to receive the storage device behind the front, the bracket insertable into the chassis; and
    a retaining mechanism mounted to the bracket to secure the bracket in the chassis upon insertion of the bracket into the chassis, the retaining mechanism having a movable extension which protrudes beyond the front of the bracket.

5. A self-locking mounting apparatus, comprising:
    a chassis;
    at least one flange connected to the chassis;
    a bracket configured to engage the at least one flange connected to the chassis, the bracket having a first side, a second side and a front, the front coupled to and between the first side and the second side and having an inner surface adapted to receive a mountable device behind the front;

a latch mounted to one of the first side and second side of the bracket, the latch having a movable extension which protrudes beyond the front of the bracket; and a tab on the chassis, the tab adapted to engage the latch mounted to the bracket upon insertion of the bracket into the chassis.

6. The self-locking mounting apparatus of claim 5, wherein the latch is a spring latch.

7. The self-locking mounting apparatus of claim 5, further comprising a mountable device, wherein the mountable device is a computer storage device for placement on the bracket.

8. The self-locking mounting apparatus of claim 5, wherein the bracket is a single piece adapted to engage the at least one flange connected to the chassis.

9. A self-locking mounting apparatus, comprising:

a bracket having a first side, a second side, a front and a portion for holding a storage device, the portion for holding the storage device bounded by the first side, the second side and the front of the bracket;

a latch with a movable extension which protrudes beyond the front of the bracket, the latch mounted to one of the first side and second side of the bracket;

a chassis having support means for supporting the bracket; and a locking means on the chassis for engaging the latch mounted to the bracket upon insertion of the bracket into the chassis.

10. The self-locking mounting apparatus of claim 9, wherein the locking means includes a tab.

11. The self-locking mounting apparatus of claim 9, wherein the latch is a spring latch.

12. The self-locking mounting apparatus of claim 9, wherein the support means includes at least one flange protruding from the chassis.

13. The self-locking mounting apparatus of claim 9, wherein the bracket is a single piece adapted to engage the support means on the chassis.

14. A self-locking mounting apparatus, comprising:

a bracket having a first side, a second side and a front, the front coupled to and between the first side and the second side, the bracket having an inner surface adapted to receive a mountable device behind the front;

at least one latch with a movable extension which protrudes beyond the front of the bracket, the at least one latch coupled to one of the first side and second side of the bracket;

a housing sized to receive the bracket;

at least one flange mounted to the housing and adapted to support the bracket; and a retaining mechanism associated with the housing and adapted to engage the at least one latch on the bracket upon insertion of the bracket into the housing.

15. The self-locking mounting apparatus of claim 14, wherein the retaining mechanism includes a tab for each latch disposed on a side of the housing to engage each such latch.

16. The self-locking mounting apparatus of claim 14, including a plurality of flanges protruding from the housing.

17. The self-locking mounting apparatus of claim 14, wherein the bracket is a single piece adapted to engage the at least one flange mounted to the housing.

18. A method for securely mounting a storage device to a chassis, comprising the steps of:

attaching the storage device to a bracket;

inserting the bracket into the chassis, the bracket being supported by at least one flange on the chassis and having a first side, a second side and a front, the front of the bracket coupled to and between the first side and the second side and having an inner surface adapted to receive a mountable device behind the front, the bracket having a latch with a movable extension which protrudes beyond the front of the bracket; and securely engaging the bracket to the chassis with the latch.

* * * * *